Oct. 19, 1926.
E. E. DAVIDSON ET AL
1,603,325
TUBE MACHINE
Filed Sept. 19, 1924
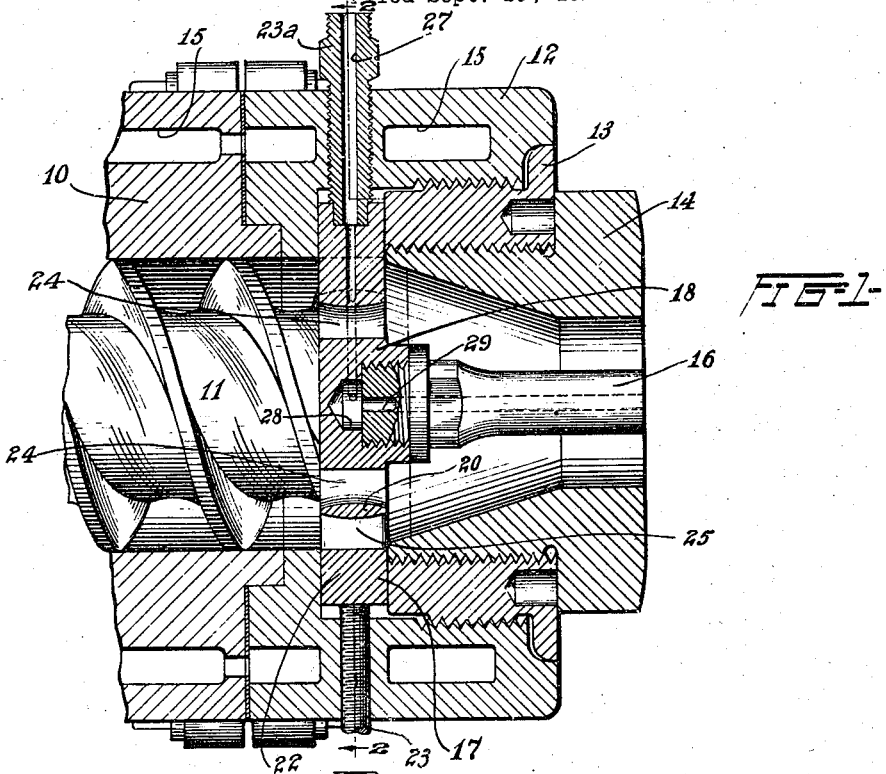
FIG-1-
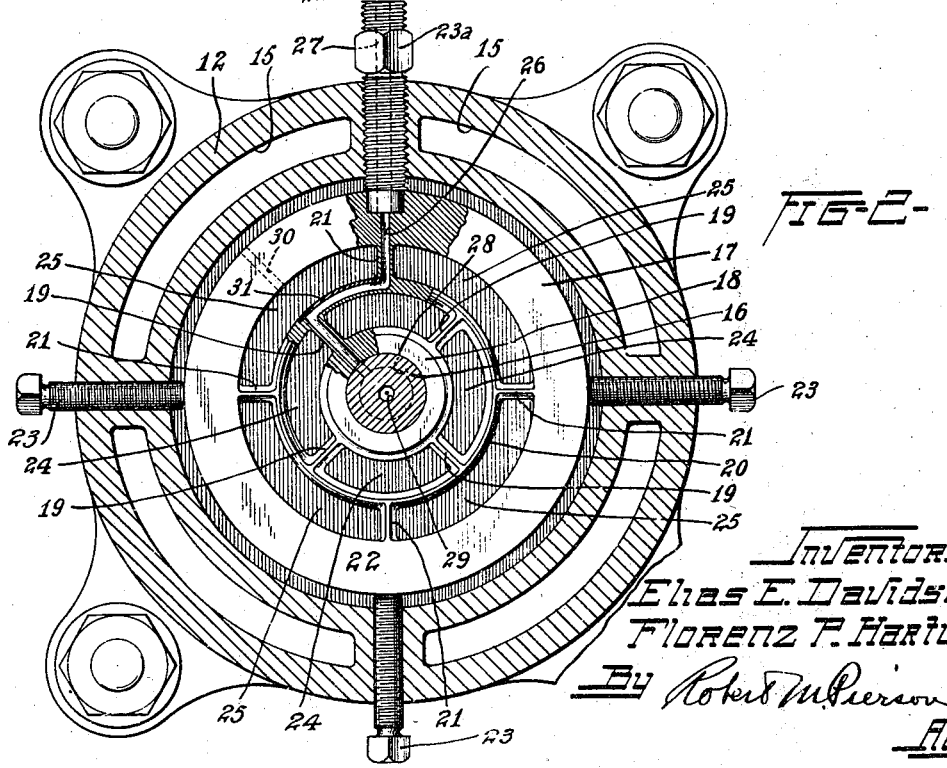
FIG-2-
Inventors
Elias E. Davidson.
Florenz P. Hartung
By Robert M. Pierson
Atty.

Patented Oct. 19, 1926.                              1,603,325

UNITED STATES PATENT OFFICE.

ELIAS E. DAVIDSON AND FLORENZ P. HARTUNG, OF AKRON, OHIO, ASSIGNORS TO THE B. F. GOODRICH COMPANY, OF NEW YORK, N. Y., A CORPORATION OF NEW YORK.

TUBE MACHINE.

Application filed September 19, 1924. Serial No. 738,587.

This invention relates to spiders such as are used for supporting the mandrel of an extruding or tube machine, such machines being used in the rubber art, for example, for extruding a mass of plastic rubber compound in the form of a tube, the stock being forced through a delivery die which surrounds the freely projecting end of a mandrel having its base or inner end secured to the spider or web mounted within the machine.

The great pressure exerted upon the stock by the feed-screw, to force the stock through the spider and through the annular passage defined by the die and mandrel, requires that the spider's hub, to which the mandrel is attached, be provided with radial arms or web elements of considerable size in cross-section, to provide the necessary strength for supporting the mandrel accurately in position. The separation of the flowing stock by the radial arms of the spider, in such machines as have been used prior to our invention, has frequently resulted in the production of a tube of non-uniform wall-thickness, particularly in the case of a high grade stock, having such "life" or resilience as appreciably to swell transversely of the tube wall as it emerges from the die, the shielding effect of the radial spider arms apparently resulting in regions of comparatively low compression in the viscous stock, or zones in which the grain of the stock is peculiarly distorted. Said zones apparently extend from each spider arm to the die's delivery aperture, the latter preferably being not far from the spider, in order that the mandrel may be of such short length as not to be bent or misaligned by the great pressure of the stock. The effect described is especially objectionable in the case of thin-walled tubes, where variations of thickness may result in extremely thin zones such as greatly to weaken the product.

Various expedients have been proposed for avoiding the result described, but all of those prior to our invention, so far as we are aware, have had inherent defects. When the spider is dispensed with and the mandrel is secured to the feed-screw, for example, and rotates therewith, objectionable gyration of the delivery end of the mandrel is difficult to avoid. When the mandrel is mounted in an axial bore formed in the feed-screw, and held stationary by attachment to the feed cylinder, in order to dispense with the spider, flow of stock into the bore of the screw, about the mandrel, and consequent binding, is difficult to avoid.

The chief object of our invention is to provide a simple and at the same time effective type of spider for holding the mandrel in position without resulting in objectionable variation of wall-thickness in the product, and a further and more specific object is to provide such an improved spider adapted for use in production of thin walled, readily collapsible tubes, whereby, in conjunction with uniformity of wall thickness, the adhesion of the inner walls of the tube may be avoided, as by discharging a blast of powdered soapstone into the tube as it is formed.

In attainment of these objects we have found that the variations of pressure or structure in each segmental zone of stock passing through the aperture between adjacent spider arms may be compensated by overlaying upon such zone and the one adjacent thereto, in mismatched relation, another zone of stock having complementary variations, this effect being obtainable by the provision of an outer series of apertures through the spider, properly mismatched with an inner series of apertures.

Of the accompanying drawings:

Fig. 1 is a vertical, longitudinal section of the delivery end portion of a tube machine embodying our invention.

Fig. 2 is a section on line 2—2 of Fig. 1, our improved mandrel-holding spider being shown in elevation and broken away to show its internal structure.

Referring to the drawings, 10 is the cylinder, 11 the feed-screw, 12 the head, 13 the die-holding bushing, and 14 the die of a tube machine adapted for extruding rubber tubes and provided with the usual steam-passages 15, 15 for keeping the stock warm and plastic. The mandrel, 16, is mounted upon our improved die-holding spider 17.

Said spider comprises a hub 18, into which the rear end of the mandrel is screwed, a set of spider arms or webs 19, 19, here shown as four, radiating from said hub, a web ring 20 connecting the outer ends of said arms, a second set of arms 21, 21, circumferentially offset or staggered with relation to those of the first set, and radiating from said ring, and a relatively heavy outer ring 22 connecting the outer ends of the arms 21, and centered by set screws 23, 23 and an axially apertured plug 23ª threaded through the head 12, said hub arms and rings defining an inner series of passages 24, 24, and an outer set of passages 25, 25, the passages of each series overlapping those of the other, circumferentially of the machine.

The spider 17 is preferably formed of strong metal such as vanadium steel, in order that the arms 19 and 21 and the ring 20 may have sufficient strength without excessive size, and said arms and ring are thinned toward their edges, fore and aft, as shown, in order to permit a smooth and substantially stream-line flow of stock.

It is important that the inner passages 24 and the outer passages 25 be so proportioned and relatively positioned as to cause the variations in the characteristics or condition of the stock passing through the outer series of passages to compensate those of the stock passing through the inner passages, and we find that this may be simply and easily accomplished by forming the spider with two concentric series of passages of equal radial width and with the outer set of radial arms in evenly spaced alternation with those of the inner set. We do not wholly limit our claims, however, to only two such series of passages. It will be seen that the several sections of stock, passing through the respective apertures, will flow together in imbricated relation as they pass to the delivery aperture of the die, providing a laminating effect.

In order to prevent adhesion of the inner walls of the rubber tube in case it collapses or is collapsed before vulcanization, the spider is formed with a soapstone passage or conduit 26, communicating at its outer end with the axial bore 27 of the plug 23ª, said passage 26 extending longitudinally in one of the outer set of radial arms 21, circumferentially in the ring 20 to an adjacent radial arm 19 of the inner set, and longitudinally in the latter to a recess 28 in the spider's hub 18, said recess communicating with an axial bore 29 formed in the mandrel 16, and the plug 23ª being adapted to be connected with a suitable device for blowing soapstone, through the mandrel, into the interior of the tube as the latter is formed.

The crooked passage or conduit 26 is preferably formed in the spider by drilling the outer radial reach thereof from the outer periphery of the spider, drilling a radial hole at 30, Fig. 2, through the outer ring 22 of the spider and through said hole drilling the inner radial reach of the conduit, milling a channel in the outer face of the web ring 20 to connect said radial reaches, and inserting and brazing in place a bridge plate 31 to close the open side of said channel. The radial hole at 30 in the outer ring 22 is then plugged.

Our invention is susceptible of modification without departure from its scope, and we do not wholly limit our claims to the specific construction shown.

We claim:

1. A tube machine comprising a die, means for forcing plastic material through said die, a mandrel, and means for holding said mandrel within said die, said mandrel holding means comprising a spider having web portions defining a plurality of annular series of stock passages, the inner and outer walls of said passages being of concentric, arcuate form, and the passages of the respective series being of such relative radial width and so disposed in alternate relation circumferentially of the spider as substantially to neutralize the effect of the radial web portions upon the wall-thickness of the extruded tube.

2. A tube machine comprising a die, means for forcing plastic material through said die, a mandrel, and means for holding said mandrel within said die, said mandrel holding means comprising a spider having web portions defining two concentric, annular series of segment-shaped stock passages, the passages of one series being of substantially the same radial width as those of the other series, and each passage of one series being symmetrically disposed with relation to a radial, axial plane passing substantially midway between adjacent passages of the other series.

3. A tube machine comprising a die, means for forcing plastic material through said die, an apertured mandrel, and means for holding said mandrel within said die, said mandrel holding means comprising a spider having web portions defining an inner and an outer annular series of stock passages, the passages of each series being circumferentially offset with relation to those of the other, and a web portion of said spider being formed with a conduit leading from a part of the spider radially outside of said annular series of stock passages to a part thereof radially within said series.

4. A tube machine comprising a die, means for forcing plastic material through said die, an apertured mandrel, and means for holding said mandrel within said die, said mandrel holding means comprising a spider having a hub portion constituting a support for the mandrel, a set of arms extending outwardly from said hub, an annular web connecting the outer ends of said arms, and a second set of arms extending outwardly from said annular web and circumferentially offset from the arms of the first set, said spider being formed with a conduit extending longitudinally in an arm of one set, then longitudinally in said annular web, and then longitudinally in an arm of the other set.

In witness whereof we have hereunto set our hands this 16th day of September, 1924.

ELIAS E. DAVIDSON.
FLORENZ P. HARTUNG.